US006134248A

United States Patent [19]

[11] Patent Number: 6,134,248

[45] Date of Patent: Oct. 17, 2000

Kawasaki et al.

[54] METHOD FOR TRANSMITTING DATA WITH TOLERANCE FOR SUPERIMPOSED DATA

[75] Inventors: Shinji Kawasaki, Suita; Hiroyasu Okada, Kawanishi, both of Japan

[73] Assignee: Matsushita Electric Industrial Co., Ltd., Kadoma, Japan

[21] Appl. No.: 08/933,741

[22] Filed: Sep. 23, 1997

[30] Foreign Application Priority Data

Sep. 24, 1996 [JP] Japan .................................... 8-251087

[51] Int. Cl.[7] ........................................................ H04J 3/06

[52] U.S. Cl. ............................................ 370/519; 370/522

[58] Field of Search .................................... 370/522, 519, 370/321, 337, 347, 442, 458, 498, 445

[56] References Cited

U.S. PATENT DOCUMENTS

| | | | |
|---|---|---|---|
| 4,335,468 | 6/1982 | Foster et al. | 455/67 |
| 4,847,835 | 7/1989 | Le Lann et al. | 370/85 |
| 4,928,099 | 5/1990 | Drake | 340/825.28 |
| 5,359,602 | 10/1994 | Diaz et al. | 370/85.8 |
| 5,428,603 | 6/1995 | Kivett | 370/346 |
| 5,438,328 | 8/1995 | Kweon | 340/825.63 |
| 5,515,366 | 5/1996 | Chieu et al. | 370/478 |
| 5,550,831 | 8/1996 | Tanahashi | 370/514 |
| 5,689,502 | 11/1997 | Scott | 370/522 |
| 5,689,503 | 11/1997 | Wada et al. | 370/337 |
| 5,712,982 | 1/1998 | Marcel | 370/442 |
| 5,793,756 | 8/1998 | Ayerst et al. | 370/522 |
| 5,881,061 | 3/1999 | Iizuka et al. | 370/337 |

FOREIGN PATENT DOCUMENTS 9-023489 1/1997 Japan .

*Primary Examiner*—Huy D. Vu
*Assistant Examiner*—Jasper Kwoh
*Attorney, Agent, or Firm*—Renner, Otto, Boisselle & Sklar LLP

[57] ABSTRACT

A method for transmitting data from each of n transmitting devices (1) to (n) is provided. According to this method, the data is transmitted with each of a plurality of transmission cycles being one group. Each of the plurality of transmission cycles includes a transmission unit and a first transmission rest period, and the transmission unit includes at least n transmission periods and at least (n−1) second transmission rest periods. The transmission periods and the second transmission rest periods are alternately repeated. The method includes the step of transmitting send data and determination data for determining whether or not two given transmission periods belong to an identical transmission cycle during each of the at least n transmission periods, where n is a positive integer.

4 Claims, 8 Drawing Sheets

Send signal $S_1$ of transmitting device (1)

Send signal $S_2$ of transmitting device (2)

Send signal which has reached receiving device

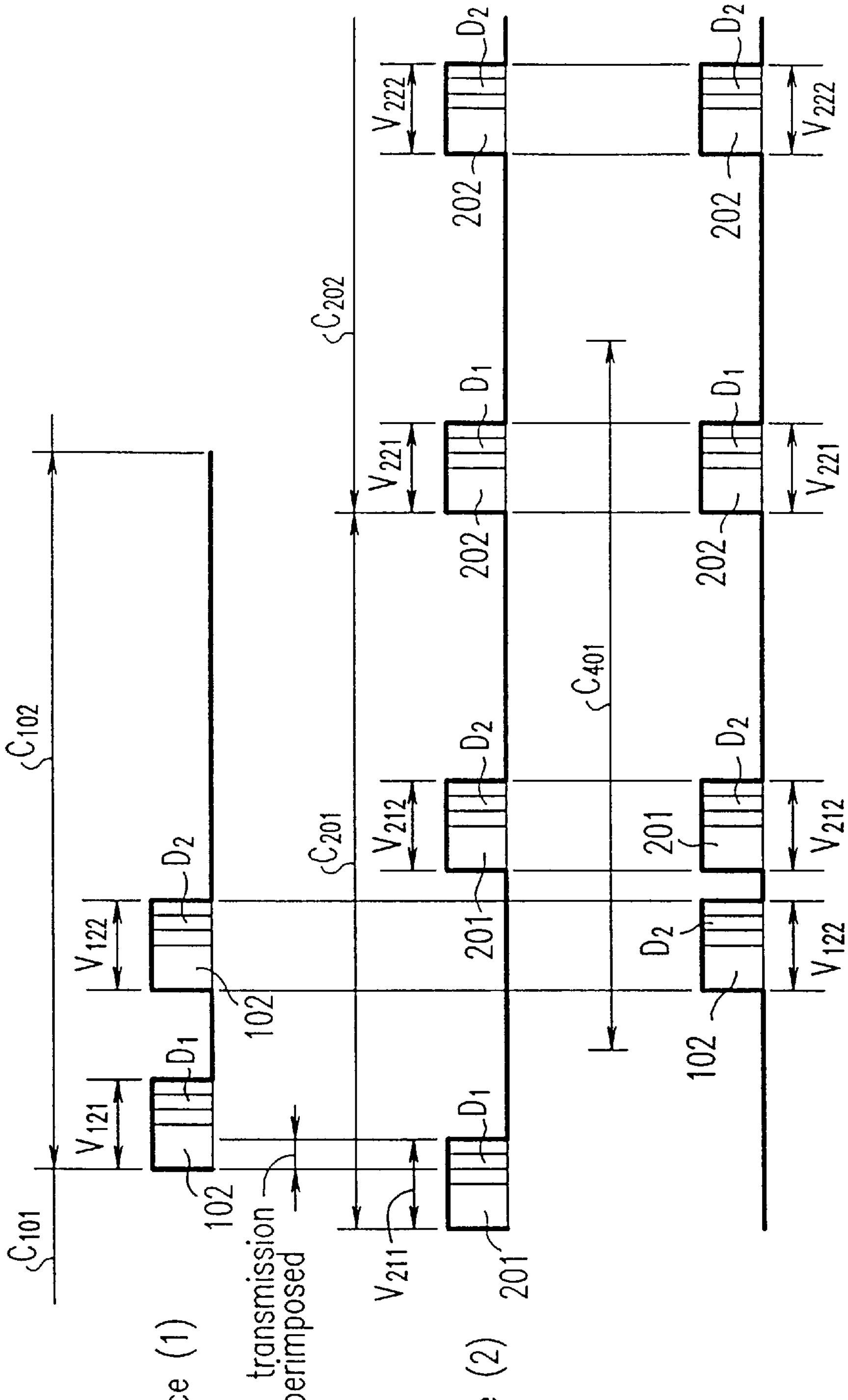
FIG. 4(a) Send signal $S_1$ of transmitting device (1)
FIG. 4(b) Send signal $S_2$ of transmitting device (2)
FIG. 4(c) Send signal which has reached receiving device

METHOD FOR TRANSMITTING DATA WITH TOLERANCE FOR SUPERIMPOSED DATA

BACKGROUND OF THE INVENTION

1. Field of the Invention

The present invention relates to a method for transmitting data. In particular, the present invention relates to a method for transmitting send data in which each of a plurality of transmitting devices transmits data to a receiving device at such a timing as to allow data to be superimposed on each other.

2. Description of the Related Art

An example of a system using a method for transmitting data includes a remote control system which remotely controls various equipment.

A remote control system includes a transmitting device which transmits send data based on manipulations and a receiving device disposed on equipment side, which receives data transmitted through a space, decodes the receive data, and transmits a predetermined signal to the equipment based on a decoding result. The transmitting device of the remote control system is operated away from the equipment.

A general remote control system uses a method for transmitting data in which send data is transmitted from a transmitting device at a predetermined time interval. Therefore, there are no problems in the case where only one transmitting device is present at a limited place or in the case where a plurality of transmitting devices are used at different times.

However, in the case where a plurality of transmitting devices are simultaneously used at a limited place and transmit send data at such a timing as to allow the data to be superimposed on each other, a receiving device cannot decode the send data. This makes it impossible to remotely control equipment.

SUMMARY OF THE INVENTION

In a method for transmitting data from each of n transmitting devices (1) to (n) according to the present invention, the data is transmitted with each of a plurality of transmission cycles being one group, each of the plurality of transmission cycles includes a transmission unit and a first transmission rest period, and the transmission unit includes at least n transmission periods and at least (n−1) second transmission rest periods, the transmission periods and the second transmission rest periods are alternately repeated. The method includes the step of transmitting send data and determination data for determining whether or not two given transmission periods belong to an identical transmission cycle during each of the at least n transmission periods, where n is a positive integer.

In one embodiment of the present invention, a length of the transmission period and a length of the second transmission rest period are respectively set to be predetermined lengths in such a manner that the send data is transmitted from each of the transmitting devices without at least one transmission period during an identical transmission cycle being superimposed on any transmission period transmitted from any other transmitting device.

In another embodiment of the present invention, assuming that the length of the transmission period is T, a length of one transmission cycle is at least 4n(n−1), a length of the second transmission rest period in a case where the data is transmitted from the transmitting device (1) is at least T, and a length of the second transmission rest period in a case where the data is transmitted from the transmitting device (i) is at least (2n+2i−5), where i is an integer of at least 2.

In another embodiment of the present invention, n=2, a period of time after a commencement of transmission of the data by the transmitting device (1) up to a commencement of a first transmission period during one transmission cycle is (P+T), and a period of time after a commencement of transmission of the data by the transmitting device (2) up to a commencement of a first transmission period during one transmission cycle is P, where P is an arbitrary constant.

In another embodiment of the present invention, the determination data is data for specifying an order in which the send data transmitted during the transmission periods belonging to an identical transmission cycle is transmitted.

In a method for transmitting data from each of two transmitting devices (1) and (2) according to the present invention, the data is transmitted with each of a plurality of transmission cycles being one group, each of the plurality of transmission cycles includes a transmission unit and a first transmission rest period, the transmission unit includes at least two transmission periods and at least one second transmission rest period, and the transmission periods and the second transmission rest period are alternately repeated. The method includes the steps of starting a first transmission period during one transmission cycle after a lapse of a period (P+T) from a commencement of transmission of the data by the transmitting device (1) and starting a first transmission period during one transmission cycle after a lapse of a period P from a commencement of transmission of the data by the transmitting device (2), where P is an arbitrary constant.

According to an aspect of the present invention, data is transmitted from each of n transmitting devices (1) to (n), with each of a plurality of transmission cycles being one group. Each of a plurality of transmitting cycles includes a transmission unit and a first transmission rest period, and the transmission unit includes at least n transmission periods and at least (n−1) second transmission rest periods. The transmission periods and the second transmission rest periods are alternately repeated. Each of n transmitting devices (1) to (n) transmits send data and determination data for determining whether or not two given transmission periods belong to an identical transmission cycle during each of at least n transmission periods.

Thus, even in the case where two or more identical pieces of send data during an identical transmission cycle reaches a receiving device without being superimposed on any send data transmitted by any other transmitting device, the receiving device can determine whether or not the receive date is transmitted during an identical transmission cycle or during different transmission cycles, based on the determination data.

Consequently, even in the case where each of two transmitting devices transmits send data to the receiving device at such a timing as to allow the data to be superimposed on each other, the common receiving device can decode the send data.

Preferably, a length of the transmission cycle and a length of the second transmission rest period are respectively set to be predetermined lengths in such a manner that each transmitting device transmits the send data without at least one transmission period during an identical transmission cycle being superimposed on any transmission period transmitted by any other transmitting device. Assuming that a length of the transmission period is T, the length of one transmission cycle is at least 4n(n−1)T, and the length of the second transmission rest period in the case where data is transmitted from the transmitting device (i) is at least (2n+2i−5)T, where i is an integer of at least 2.

According to another aspect of the present invention, the transmitting device (1) starts transmission of the first transmission period during one transmission cycle after a lapse of a period (P+T) from a commencement of data transmission. The transmitting device (2) starts the first transmission during one transmission cycle after a lapse of a period P from a commencement of data transmission.

Thus, the receiving device can determine which transmitting device has started transmitting data earlier.

Consequently, each of a plurality of transmitting devices can transmit send data to the receiving device without fail at such a timing as to allow the data to be superimposed on each other.

Thus, the invention described herein makes possible the advantages of (1) providing a method for transmitting data in which even in the case where each of a plurality of transmitting devices transmits send data to a receiving device at such a timing as to allow the data to be superimposed on each other, the receiving device can decode the send data; (2) providing a method for transmitting data in which even in the case where two or more pieces of identical send data in an identical transmission cycle can be transmitted without being superimposed on any send data transmitted from any other transmitting device, a receiving device can determine whether or not the receive data belongs to the identical transmission cycle; and (3) providing a method for transmitting data in which in the case where each of a plurality of transmitting devices starts transmitting data to a receiving device at such a timing as to allow the data to be superimposed, a receiving device can determine which transmitting device has first started transmitting the data.

These and other advantages of the present invention will become apparent to those skilled in the art upon reading and understanding the following detailed description with reference to the accompanying figures.

BRIEF DESCRIPTION OF THE DRAWINGS

FIG. 1 is a timing diagram of a send signal in a method for transmitting data in which a plurality of transmitting devices of Embodiment 1 according to the present invention transmit send data to a receiving device at such a timing as to allow the data to be superimposed.

FIG. 4 is a timing diagram in the case where transmission periods belonging to different cycles of Embodiment 2 according to the present invention reach a receiving device twice during one cycle.

DESCRIPTION OF THE PREFERRED EMBODIMENTS

The present invention will be described by way of illustrative embodiments with reference to the drawings.

Embodiment 1

A method for transmitting data of Embodiment 1 according to the present invention will be described. It is noted that the lengths of periods are merely exemplified.

The inventors of the present invention worked out a method for transmitting data in which even in the case where each of a plurality of transmitting devices transmits send data to a receiving device at such a timing as to allow the data to be superimposed on each other, the receiving device can decode the send data by allowing the data to be transmitted at different transmission intervals on a transmitting device basis (Japanese Patent Application No. 7-173133, Japanese Laid-open Publication No. 9-23489; Laid-open Publication Date: Jan. 21, 1997).

Hereinafter, a method for transmitting data of Embodiment 1 according to the present invention will be described based on the content of the above-mentioned application.

Figures 1A, 1B:
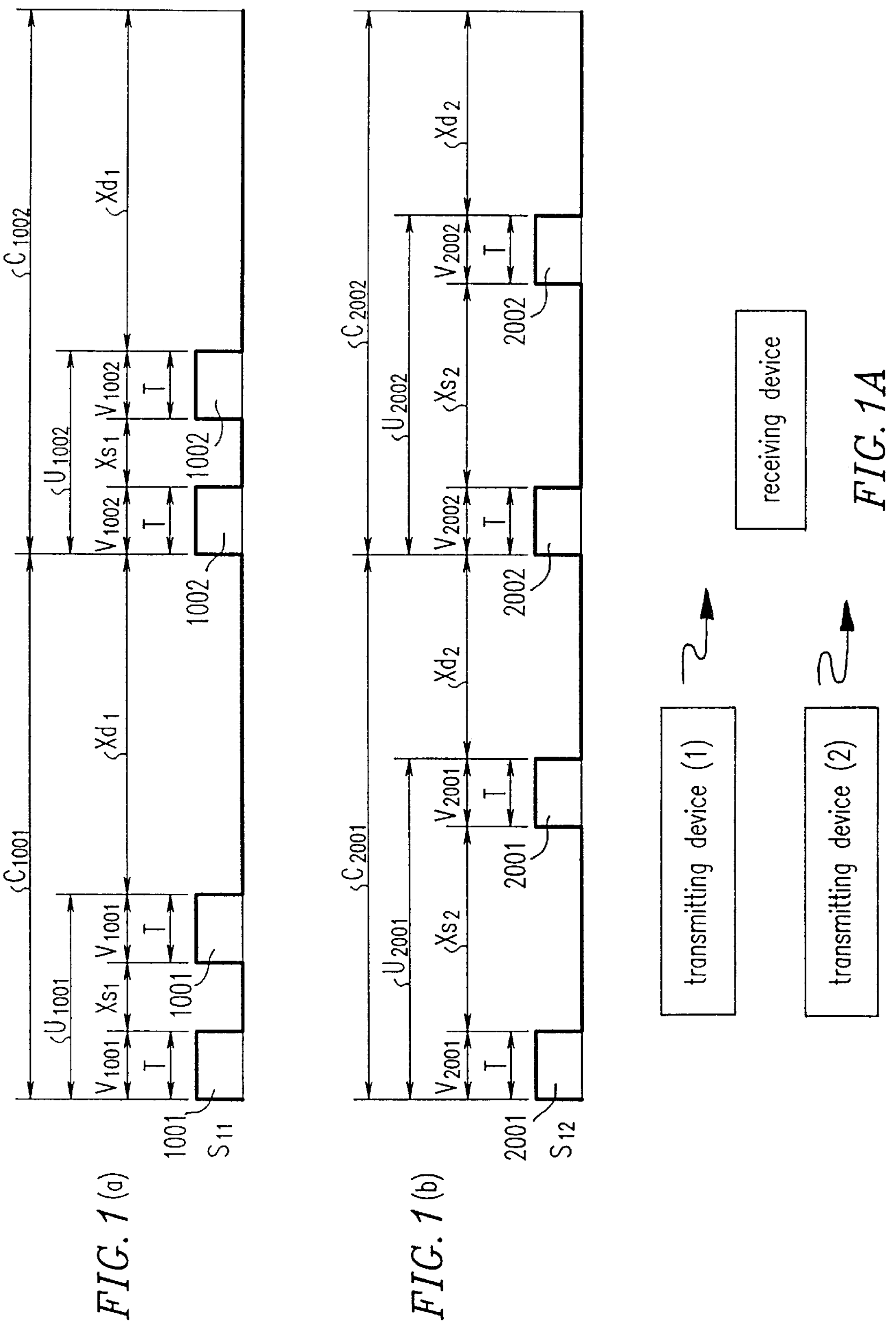
FIG. 1A is a block diagram showing a plurality of transmitting devices and a receiving device according to the present invention.

FIG. 1 is a timing diagram of a send signal in which a plurality of transmitting devices send data to a receiving (represented in FIG. 1A) device at such a timing as to allow the data to be superimposed on each other. A structure of the send signal will be described exemplifying the case where two transmitting devices (1) and (2) are simultaneously used.

Referring to (a) in FIG. 1, a send signal $S_{11}$ is transmitted from the transmitting device (1) with each of transmission cycles $C_{1001}$ and $C_{1002}$ being one group. The transmission cycle $C_{1001}$ includes a transmission unit $U_{1001}$ and a first transmission rest period $Xd_1$. The transmission cycle $C_{1002}$ includes a transmission unit $U_{1002}$ and a first transmission rest period $Xd_1$. The transmission unit $U_{1001}$ includes two transmission periods $V_{1001}$ and one second transmission rest period $Xs_1$. The transmission unit $U_{1002}$ includes two transmission periods $V_{1002}$ and one second transmission rest period $Xs_1$.

The transmission period $V_{1001}$ and the second transmission rest period $Xs_1$ are alternately repeated. The transmission period $V_{1002}$ and the second transmission rest period $Xs_1$ are alternately repeated. Send data 1001 is transmitted during respective two transmission periods $V_{1001}$. Send data 1002 is transmitted during respective two transmission periods $V_{1002}$.

Each time length of the transmission periods $V_{1001}$ and $V_{1002}$ is 1T. A time length of the second transmission rest period $Xs_1$ is 1T. Thus, each time length of the transmission units $U_{1001}$ and $U_{1002}$ is 3T.

Referring to (b) of FIG. 1, a send signal $S_{12}$ is transmitted from the transmitting device (2) with each of transmission cycles $C_{2001}$ and $C_{2002}$ being one group in the same manner as in the send signal $S_{11}$. The transmission cycle $C_{2001}$ includes a transmission unit $V_{2001}$ and a first transmission rest period $Xd_2$. The transmission cycle $C_{2002}$ includes a transmission unit $U_{2002}$ and a first transmission rest period $Xd_2$. The transmission unit $U_{2001}$ includes two transmission periods $V_{2001}$ and one second transmission rest period $Xs_2$. The transmission unit $U_{2002}$ includes two transmission periods $V_{2002}$ and one second transmission rest period $Xs_2$.

The transmission period $V_{2001}$ and the second transmission rest period $Xs_2$ are alternately repeated. The transmission period $V_{2002}$ and the second transmission rest period $Xs_2$ are alternately repeated. Send data 2001 is transmitted during respective two transmission periods $V_{2001}$. Send data 2002 is transmitted during respective two transmission periods $V_{2002}$.

Each time length of the transmission periods $V_{2001}$ and $V_{2002}$ is 1T in the same manner as in the send signal $S_{11}$. A time length of the second transmission rest period $Xs_2$ is set to be equal to that of the transmission unit $U_{1001}$ of the send signal $S_{11}$, i.e., 3T. Thus, a time length of the transmission unit $U_{2001}$ is 5T. Each time length of the transmission cycles $C_{1001}$, $C_{1002}$, $C_{2001}$, and $C_{2002}$ is equal, i.e., 8T.

Generally, in the case where n transmitting devices, i.e., transmitting devices (1) to (n) are simultaneously used, a length of the second transmission rest period $Xs_1$ of the transmitting device (i) is set to be (2n+2i−5)T or more, where i is an integer of 2 or more. A time length of the transmission cycle C is set to be 4n(n−1) times the transmission period V.

The second transmission rest period $Xs_1$ of the transmitting device (i) is set in accordance with such a predetermined rule. Each of n transmitting devices simultaneously sends data. Each of n transmitting devices transmits n pieces of send data V during one transmission cycle. Data is transmitted during the transmission period V of the transmitting device (i) with the second transmission rest period $Xs_i$ having a time length of (2n+2i−5)T being interposed. The data is transmitted during the transmission period V of the transmitting device (i+1) with the second transmission rest period $Xs_{i-1}$ having a time length of (2n+2(i+1)−5)T=(2n+2i−3)T being interposed.

Thus, the second transmission rest period $Xs_{i-1}$ of the transmitting device (i+1) is longer by 2T than the transmission rest period $Xs_i$ of the transmitting device (i). The second transmission rest period $Xs_i$ plus two transmission periods V having a time length of 1T (i.e., 2T) can fall within the second transmission rest period $Xs_{i+1}$ of the transmitting device (i+1).

When the send data 1001 and 2001 and the send data 1002 and 2002 are transmitted at such a timing as to allow the transmission periods to be superimposed on each other (i.e., in such a manner that the transmission periods $V_{1001}$ and $V_{2001}$ are superimposed and the transmission periods $V_{1002}$ and $V_{2002}$ are superimposed), a receiving device detects the superimposition of the transmission periods V and invalidates the received send data.

However, when the second transmission rest period Xs is set as described above, no matter how a transmission start timing of the transmission portion (i) is shifted from a transmission start timing of the transmitting device (i+1), the transmission period V of the send signal $S_i$ of the transmitting device (i) is not superimposed on the transmission period V of the send signal $S_{i-1}$ of the transmitting device (i+1) twice or more. This can be applied to when the transmission period V of the transmitting device (i) is superimposed on the transmission period V of the send signal S of another transmitting device. The transmission period V of the transmitting device (i) is not superimposed on the transmission period V of another particular transmitting device twice or more.

More specifically, (n−1) or less of transmission periods among n transmission periods during an identical transmission cycle can be superimposed on a transmission period of another transmitting device. However, at least one transmission period is not superimposed on any transmission period of any other transmitting porion. Therefore, at least one send data reaches the receiving device. More specifically, each transmitting device enables send data to reach the receiving device without fail by performing one cycle of transmission.

Embodiment 2

Hereinafter, a method for transmitting data of Embodiment 2 according to the present invention will be described.

According to the method for transmitting data of Embodiment 1, two or more pieces of send data among N pieces of send data containing identical data belonging to an identical transmission cycle can reach a receiving device without being superimposed on any send data transmitted from any other transmitting device.

A receiving device successively processes data transmitted from transmitting devices. However, in the case where data to be transmitted is a toggle-type command such as power-on of a TV, text, a travel of a mouse, or the like, the receiving device processes the receive data as follows.

In the case where send data which has reached a receiving device and send data which has subsequently reached the receiving device belong to an identical transmission cycle, the subsequent send data is unnecessary. In the case where send data and subsequent send data belong to different transmission cycles, the subsequent send data is necessary.

The receiving device processes receive data in the same way, irrespective of whether or not the receive date belongs to a transmission cycle identical to that of the previous data and requires no processing and irrespective of whether or not the receive data belongs to a transmission cycle different from that of the previous data and requires processing.

In the case where data to be transmitted is a command of a game or the like, information about which transmitting device among a plurality of transmitting devices starts transmitting data earlier is important. However, in the case where each of a plurality of transmitting devices starts data to the receiving device with a time difference of one transmission cycle or less, the receiving device cannot determine which transmitting device starts transmitting data earlier.

Figure 2A:
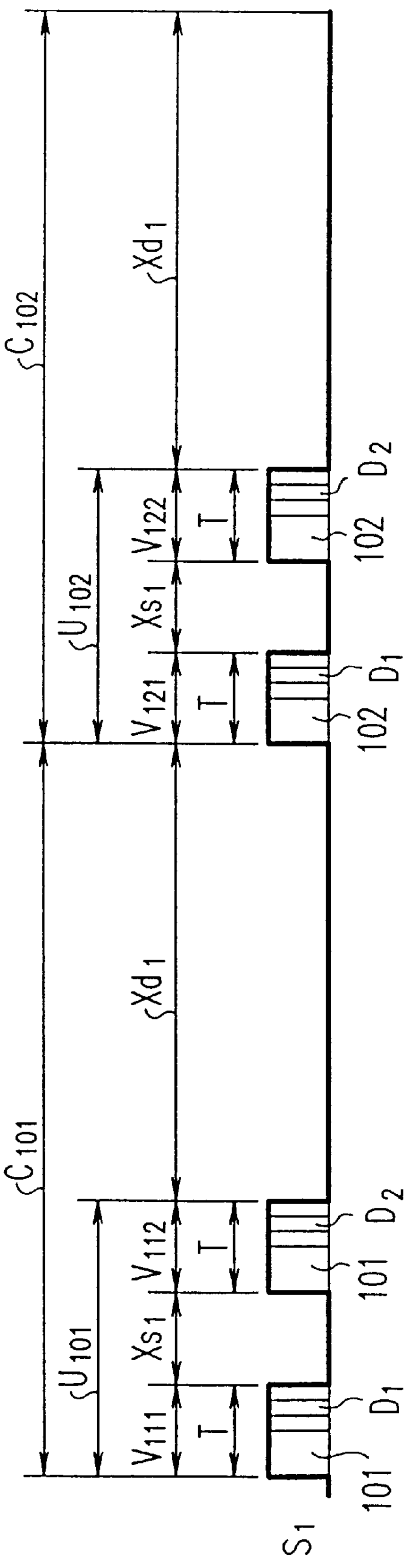
FIG. 2A is a diagram showing a structure of a send signal from a transmitting device of Embodiment 2 according to the present invention.

FIG. 2A shows a structure of a send signal from a transmitting device of Embodiment 2. The elements identical with those in the method for transmitting data shown in FIG. 1 are denoted by the reference numerals identical with those therein. The description thereof will be omitted. The structure of the send signal will be described, exemplifying the case where two transmitting devices (1) and (2) are simultaneously used.

A send signal $S_1$ is transmitted from a transmitting device with each of two transmission cycles $C_{101}$ and $C_{102}$ being one group. The transmission cycle $C_{101}$ includes a transmission unit $U_{101}$ and a first transmission rest period $Xd_1$. A transmission cycle $C_{102}$ includes a transmission unit $U_{102}$ and a first transmission rest period $Xd_1$. The transmission unit $U_{101}$ includes two transmission periods $V_{111}$ and $V_{112}$ and one second transmission rest period $Xs_1$. The transmission unit $U_{102}$ includes two transmission periods $V_{121}$ and $V_{122}$ and one second transmission rest period $Xs_1$.

Send data 101 and determination data $D_1$ for determining whether or not two given transmission periods belong to an identical transmission cycle are transmitted during the transmission period $V_{111}$. The send data 101 and determination data $D_2$ for determining whether or not two given transmission periods belong to an identical transmission cycle are transmitted during the transmission period $V_{112}$. Likewise, send data 102 and the determination data $D_1$ are transmitted during the transmission period $V_{121}$. The send data 102 and the determination data $D_2$ are transmitted during the transmission period $V_{122}$.

Figure 2B:
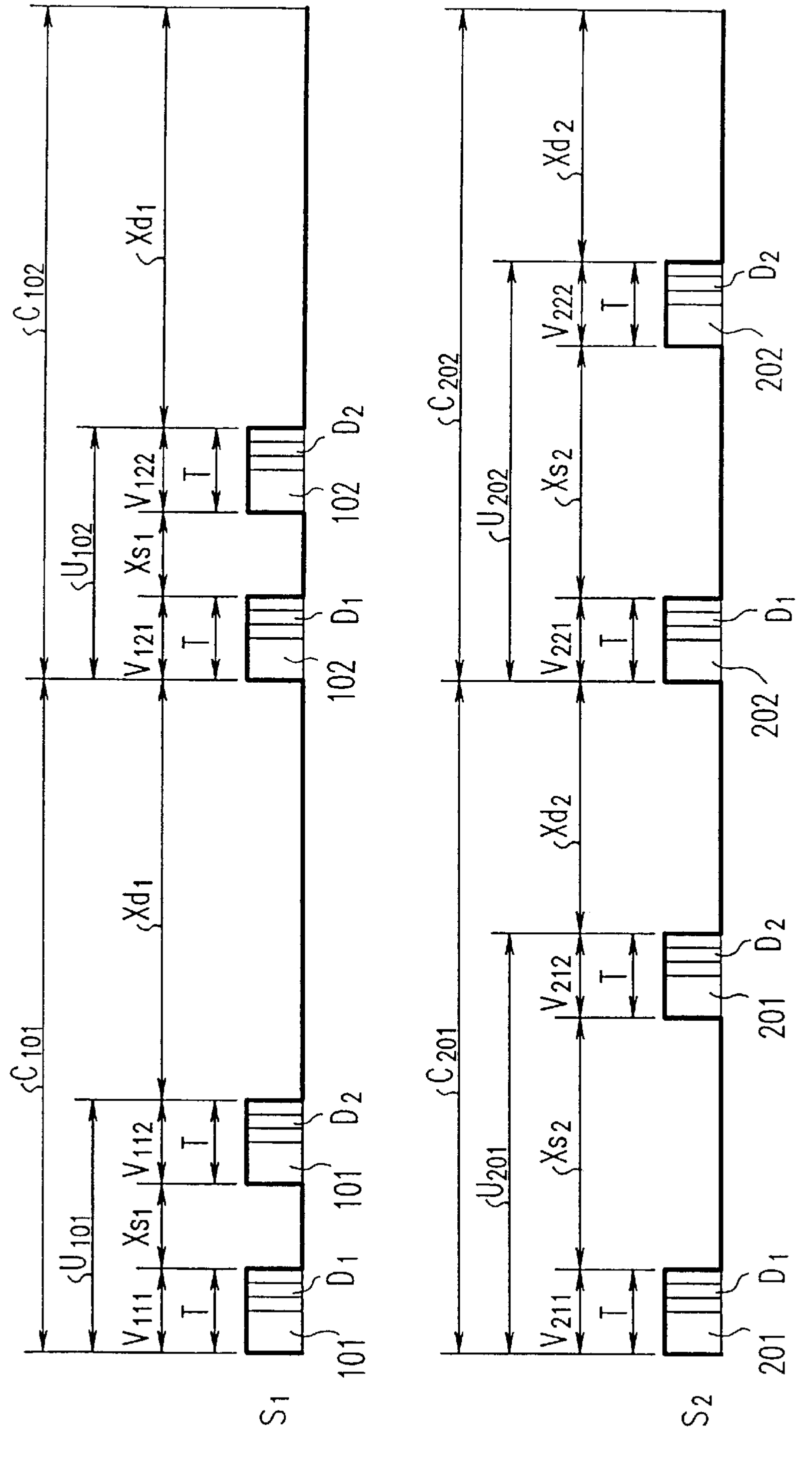
FIG. 2B is a timing diagram of send signals in the case where two transmitting devices of Embodiment 2 according to the present invention are simultaneously used.

FIG. 2B is a timing diagram of send signals in the case where two transmitting devices of Embodiment 2 are simultaneously used. Referring to (a) of FIG. 2B, the transmission unit $U_{101}$ of the send signal $S_1$ includes two transmission periods $V_{111}$ and $V_{112}$ and one second transmission rest period $Xs_1$ in the same way as in FIG. 2A. The send data 101 and the determination data $D_1$ are transmitted during the transmission period $V_{111}$. The send data 101 and the determination data $D_2$ are transmitted during the transmission period $V_{112}$.

Likewise, the transmission unit $U_{102}$ includes two transmission periods $V_{121}$ and $V_{122}$ and one second transmission rest period $Xs_1$. The send data 102 and the determination data $D_1$ are transmitted during the transmission period $V_{121}$. The send data 102 and the determination data $D_2$ are transmitted during the transmission period $V_{122}$. Referring to (b) of FIG. 2B, a transmission unit $U_{201}$ of a send signal $S_2$ includes two transmission periods $V_{211}$ and $V_{212}$ and a second transmission rest period $Xs_2$. The send data 201 and the determination data $D_1$ are transmitted during the transmission period $V_{211}$. The send data 201 and the determination data $D_2$ are transmitted during the transmission period $V_{212}$. Likewise, the transmission unit $U_{202}$ includes two transmission periods $V_{221}$ and $V_{222}$ and a second transmission rest period $Xs_2$. Sent data 202 and the determination data $D_1$ are transmitted during the transmission period $V_{221}$. The send data 202 and the determination data $D_2$ are transmitted during the transmission period $V_{222}$.

The determination data $D_1$ is composed of one bit of data "0" for determination. The determination data $D_2$ is composed of one bit of data "1" for determination. In this way, using one bit of determination data $D_1$ and $D_2$ added to the send data 101, 102, 201, and 202, it can be determined whether or not two given transmission periods belong to an identical transmission cycle.

Figure 3:
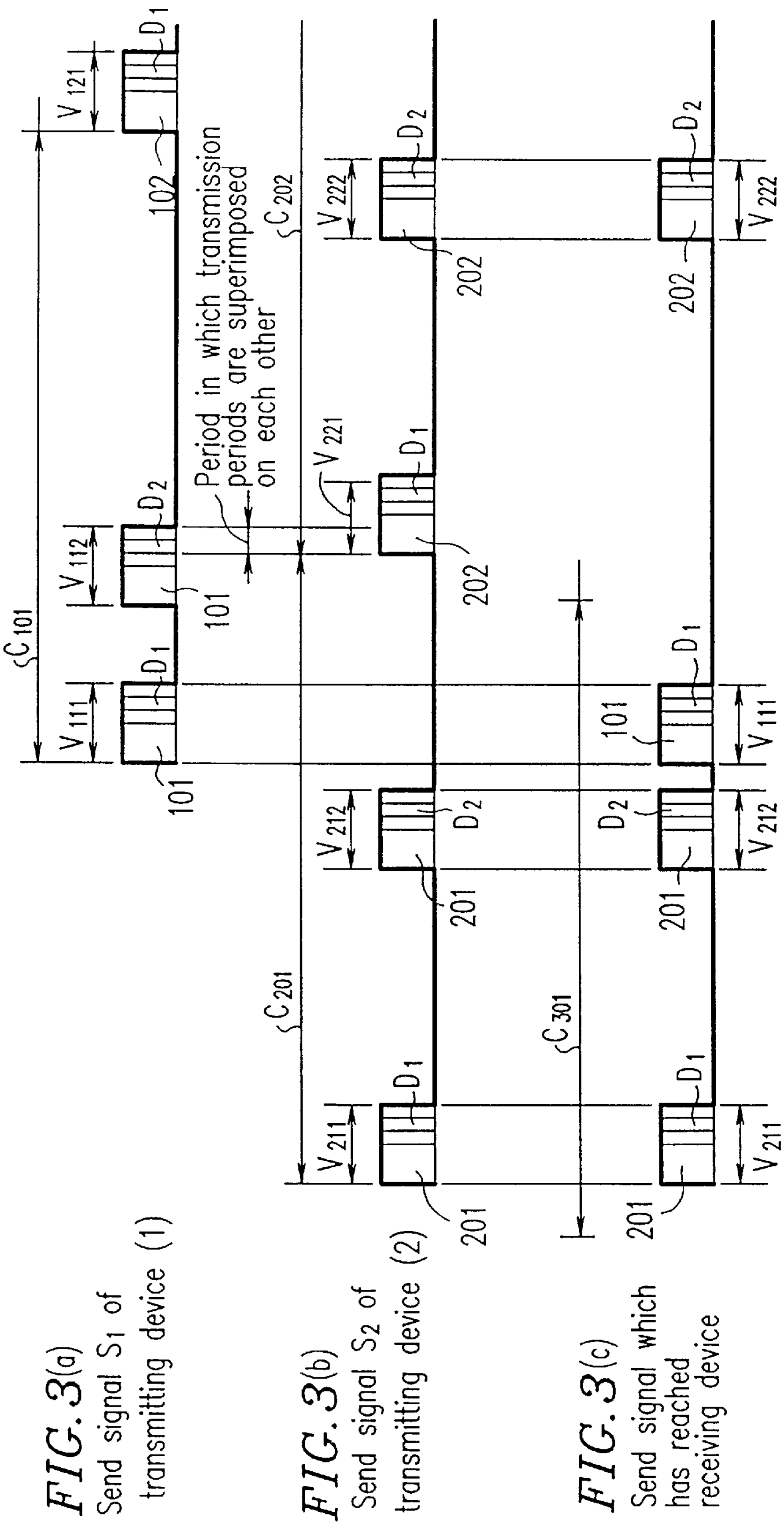
FIG. 3 is a timing diagram in the case where transmission periods belonging to an identical cycle of Embodiment 2 according to the present invention reach a receiving device twice during one cycle.

FIG. 3 is a timing diagram in the case where send data belonging to an identical transmission cycle of Embodiment 2 reaches a receiving device twice during one cycle. FIG. 4 is a timing diagram in the case where send data belonging to different transmission cycles of Embodiment 2 reaches a receiving device twice during one cycle.

As described above, two pieces or more of send data transmitted from the transmitting device (2) may reach the receiving device without being superimposed on the send data transmitted from the transmitting device (1) during one cycle.

More specifically, as shown in FIG. 3, in the case where the transmission period $V_{111}$ starts after the completion of the transmission period $V_{212}$, the transmission periods $V_{211}$ and $V_{212}$ of the transmitting device (2) are not superimposed on the transmission period of the transmitting device (1) during a cycle $C_{301}$. Thus, the send data 201 transmitted during the transmission period $V_{211}$ and the send data 201 transmitted during the transmission period $V_{212}$ reach the receiving device.

As shown in FIG. 4, in the case where the transmission during the transmission period $V_{122}$ is completed before the commencement of transmission during the transmission period $V_{212}$, the transmission periods $V_{212}$ and $V_{221}$ of the transmitting device (2) are not superimposed on the transmission period of the transmitting device (1). Thus, the send data 201 transmitted during the transmission period $V_{212}$ and the send data 202 transmitted during the transmission period $V_{221}$ reach the receiving device.

As shown in (c) of FIG. 3, in the case where the determination data $D_1$ and $D_2$ reach the receiving device in this order from the transmitting device 2 during the cycle $C_{301}$, the receiving device can determine that the first transmission period $V_{211}$ and the second transmission period $V_{212}$ belong to an identical transmission cycle, i.e., the transmission cycle $C_{201}$.

As shown in (c) of FIG. 4, in the case where the determination data $D_2$ and $D_1$ reach the receiving device in this order during the cycle $C_{401}$, the receiving device can determine that the first transmission period $V_{212}$ and the second transmission period $V_{221}$ belong to different transmission cycles.

As described above, the receiving device can determine whether or not the received transmission periods belong to an identical transmission cycle, based on the determination data added to the send data received from an identical transmitting device during one cycle. Therefore, the receiving device can select the received send data, if required.

In the case where data to be transmitted is a toggle-type command such as power-on of a TV, text, a travel of a mouse, or the like: the receiving device as in the case of (c) of FIG. 4 can determine that the transmission period which has reached the receiving device at the second time is necessary data; and the receiving device as in the case of (c) of FIG. 3 can determine that the transmission period which has reached the receiving device at the second time is unnecessary data. The receiving device can transmit a predetermined signal to equipment based on this determination.

In the present embodiment, one bit of data for determination is used for determining whether or not data transmitted from an identical transmitting device during one transmission cycle belongs to an identical cycle. However, the present invention is not limited thereto. For example, even when other means such as a plurality of bits of data (e.g., a serial number on a transmission cycle basis of a transmission period) is used, the same effect can be obtained.

In the present embodiment, the case where data can be transmitted in a minimum period of time is exemplified. However, the present invention is not limited thereto. It is appreciated that even when the structure and time length of one transmission cycle are varied, for example, by extending the transmission period V or the second transmission rest period Xs and/or by increasing the repetition time, if required, the same effect as described above can be obtained by applying the method for transmitting data of the present embodiment.

Furthermore, In the present embodiment, the case where two transmitting devices are used is exemplified. However, the present invention is not limited thereto. Even when three or more transmitting devices are used, the same effect can be obtained by applying the method for transmitting data of the present embodiment.

Next, a method for transmitting data will be described, in which in the case where each of two transmitting devices starts transmitting send data to a receiving device at such a timing as to allow the data to be superimposed on each other, the receiving device can determine which transmitting device has started transmitting the data earlier.

Figures 5A, 5B, 5C:
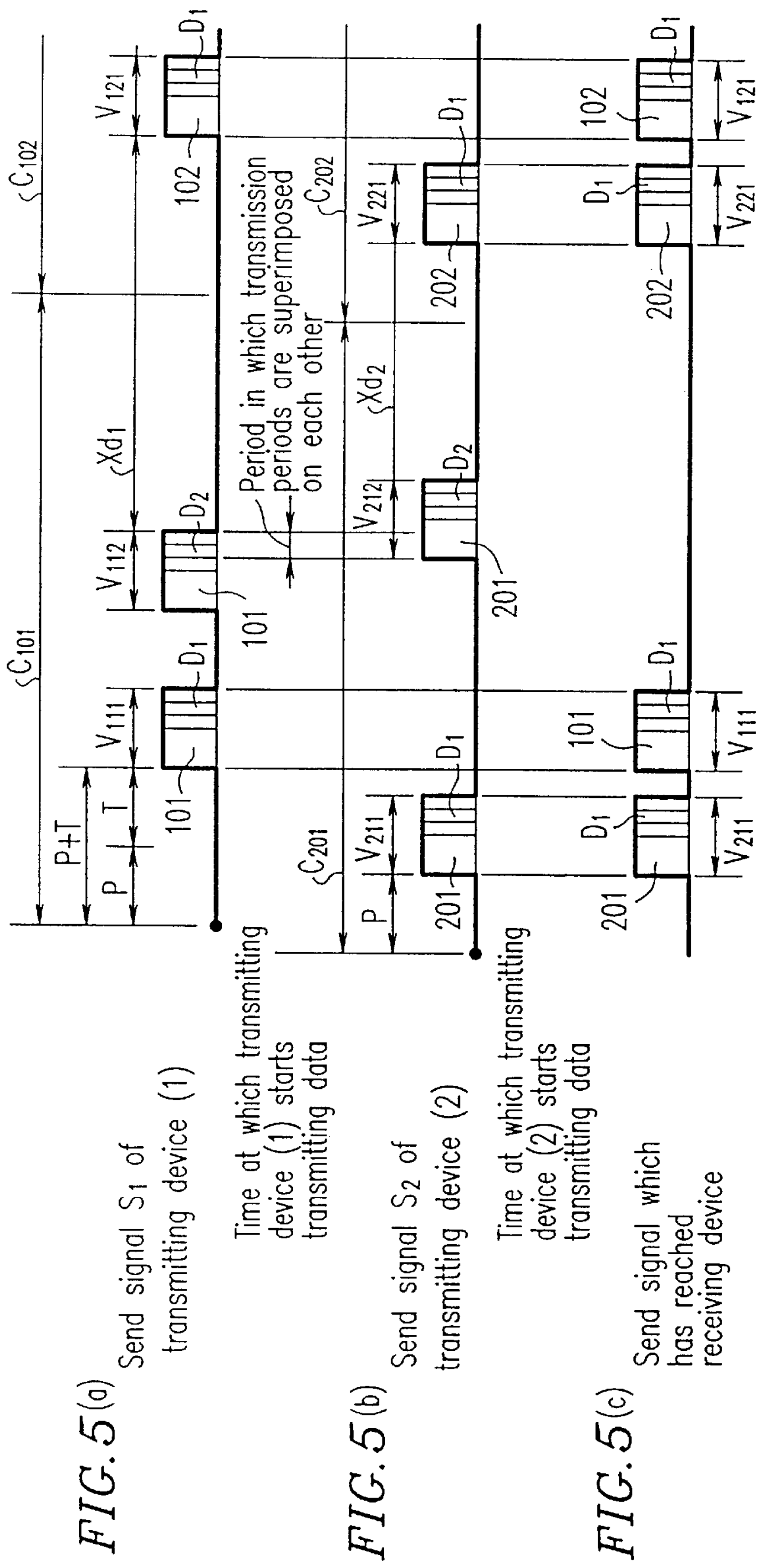
FIG. 5 is a timing diagram in the case where a transmitting device (2) starts transmitting data earlier than a transmitting device (1) in Embodiment 2 according to the present invention.
Figures 6A, 6B, 6C:
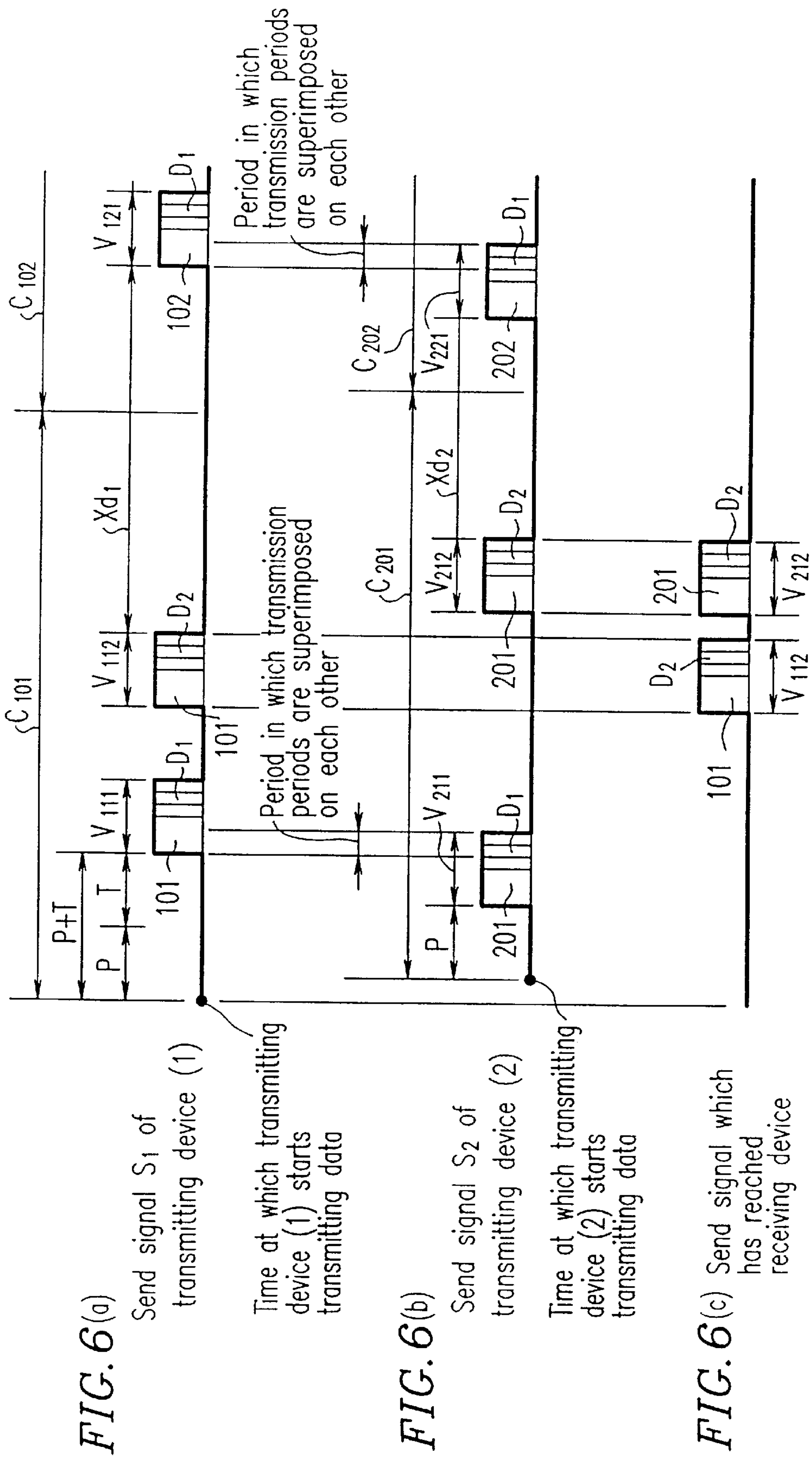
FIG. 6 is a timing diagram in the case where the transmitting device (1) starts transmitting data earlier than the transmitting device (2) by 0 to 2T in Embodiment 2 according to the present invention.
Figures 7A, 7B, 7C:
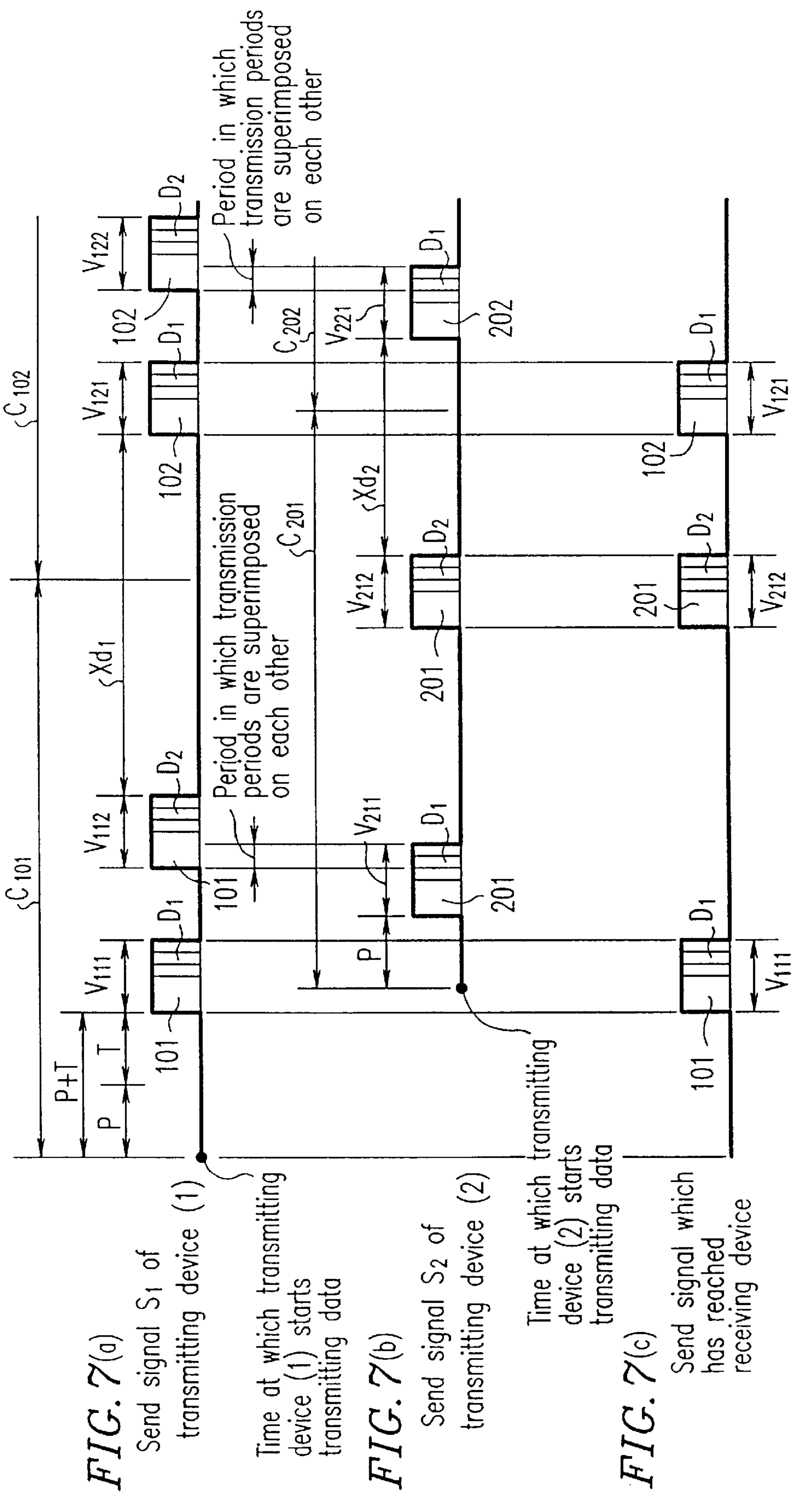
FIG. 7 is a timing diagram in the case where the transmitting device (1) starts transmitting data earlier than the transmitting device (2) by 2T or more in Embodiment 2 according to the present invention.

FIG. 5 is a timing diagram in the case where the transmitting device (2) starts transmitting data earlier than the transmitting device (1). FIG. 6 is a timing diagram in the case where the transmitting device (1) starts transmitting data earlier than the transmitting device (2) by 0T to 2T. FIG. 7 is a timing diagram in the case where the transmitting device (1) starts transmitting data earlier than the transmitting device (2) by 2T or more.

Referring to (b) in FIG. 5, the first transmission period $V_{211}$ of the first transmission cycle $C_{201}$ starts after a lapse of a period P from the commencement of transmission by the transmitting device (2). The first transmission period $V_{111}$ of the first transmission cycle $C_{101}$ starts after a lapse of a period P+T from the commencement of the transmission by the transmitting device (1). More specifically, the period of time after the commencement of the transmission by the transmitting device 1 up to the commencement of the transmission period $V_{111}$ during the first transmission cycle $C_{101}$ is longer by a period T than the period of time after the commencement of the transmission by the transmitting device 2 up to the commencement of the first transmission period $V_{211}$ during the first transmission cycle $C_{201}$.

Hereinafter, the case where the period P is equal to the period T will be exemplified.

As shown in FIG. 5, in the case where the transmitting device (2) starts transmitting data earlier than the transmitting device (1), the send date 201 during the first transmission period $V_{211}$ of the transmitting device (2) reaches the receiving device. Thereafter, the send data 101 during the first transmission period $V_{111}$ of the transmitting device (1) reaches the receiving device.

As shown in FIG. 6, in the case where the transmitting device (1) starts transmitting data earlier than the transmitting device (2) by 0T to 2T, the first transmission period $V_{111}$ of the transmitting device (1) is superimposed on the first transmission period $V_{211}$ of the transmitting device (2). The receiving device detects the superimposition between the transmission period $V_{111}$ and the transmission period $V_{211}$ and invalidates the send data 101 and 201 contained in the received transmission periods. Thereafter, the send data 101 during the second transmission period $V_{112}$ of the transmitting device (1) reaches the receiving device. Thereafter, the send data 201 during the second transmission period $V_{212}$ of the transmitting device (2) reaches the receiving device.

As shown in FIG. 7, in the case where the transmitting device (1) starts transmitting data earlier than the transmitting device (2) by 2T or more, the send data 101 during the first transmission period $V_{111}$ of the transmitting device (1) reaches the receiving device. Thereafter, the second transmission period $V_{112}$ of the transmitting device (1) is superimposed on the first transmission period $V_{211}$ of the transmitting device (2). The receiving device detects the superimposition between the transmission period $V_{112}$ and the transmission period $V_{211}$ and invalidates the send data 101 and 201 contained in the received transmission periods. Thereafter, the send data 201 during the second transmission period $V_{212}$ of the transmitting device (2) reaches the receiving device.

More specifically, in the case where the send data 101 during the second transmission period $V_{112}$ of the transmitting device (1) reaches the receiving device, and thereafter, the send data 201 during the second transmission period $V_{212}$ of the transmitting device (2) reaches the receiving device (FIG. 6), or in the case where the send data 101 during the first transmission period $V_{111}$ of the transmitting device (1) reaches the receiving device, and thereafter, the send data 201 during the second transmission period $V_{212}$ of the transmitting device (2) reaches the transmitting device (FIG. 7), the receiving device can determine that the transmitting device (1) has started transmitting data earlier than the transmitting device (2).

In the case where the send data 201 during the first transmission period $V_{211}$ of the transmitting device (2) reaches the receiving device, and thereafter, the send data 101 during the first transmission period $V_{111}$ of the transmitting device (1) reaches the receiving device (FIG. 5), the receiving device can determine that the transmitting device (2) has started transmitting data earlier than the transmitting device (1).

As described above, even in the case where send date is transmitted from two transmitting devices with a time difference of one transmission cycle or less, the receiving device can determine which transmitting device has started transmitting data earlier. In the case where which transmitting device of two transmitting devices has started transmitting a command earlier becomes one information, for example, in the case where the content of data to be transmitted is a command of a game or the like, the above-mentioned method for transmitting data becomes particularly useful.

In the present embodiment, the case where the determination data is transmitted has been described. However, the present invention is not limited thereto. Even in the case where the determination data is not transmitted, the same effect as described above can be obtained.

In the present embodiment, the case where the period P is equal to the period T is described. However, the present invention is not limited thereto. There is no limit to the length of the period P. Since a period of time required for transmitting data is preferably shorter, data can be transmitted most efficiently when P=0.

It is also appreciated that the method for transmitting data of the present invention is useful when a plurality of transmitting devices transmit data to one receiving device. Even in the case where a plurality of transmitting devices transmit data to a plurality of receiving devices, the method for transmitting date of the present embodiment is useful.

Furthermore, even when a medium used in the method for transmitting data of the present embodiment is a one-way or two-way cable communication path or a one-way or two-way wireless communication path of radio frequency (RF), infrared rays, a sound wave, etc., the same effect as described above can be obtained.

According to the present invention, each of n transmitting devices (1) to (n) transmits send data and determination data for determining whether or not two given transmission periods belong to an identical transmission cycle during each of n or more transmission periods. Thus, even in the case where two or more identical transmission periods during an identical transmission cycle are transmitted without being superimposed on any send date transmitted from any other transmitting device, the receiving device can determine whether or not the receive data belongs to an identical transmission cycle.

Because of this, a method for transmitting data can be provided, in which even in the case where each of a plurality of transmitting devices transmits data to the receiving device at such a timing as to allow the data to be superimposed on each other, the receiving device can decode the data.

Furthermore, according to the present invention, the transmitting device (1) starts transmission of the first transmission period during one transmission cycle after a lapse of the period P+T from the commencement of data transmission. The transmitting device (2) starts transmission of the first transmission period during one transmission cycle after a lapse of the period P from the commencement of data transmission.

Accordingly, even when each of two transmitting devices transmits data to the receiving device at such a timing as to allow the data to be superimposed on each other, the receiving device can determine which transmitting device has started transmitting data earlier.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for transmitting data from each of n transmitting devices 1 to n, the data being transmitted with each of a plurality of transmission cycles being one group, each of the plurality of transmission cycles including a transmission unit and a first transmission rest period, the transmission unit including at least n transmission periods and at least n−1 second transmission rest periods, the transmission periods and the second transmission rest periods being alternately repeated, the method comprising the step of transmitting send data and determination data for determining whether two given transmission periods belong to an identical transmission cycle during each of the at least n transmission periods, where n is a positive integer, wherein a length of the transmission period and a length of the second transmission rest period are respectively set to be predetermined lengths in such a manner that the send data is transmitted from each of the transmitting devices without at least one transmission period during an identical transmission cycle being superimposed on any transmission period transmitted from any other transmitting device, and assuming that the length of the transmission period is T, the length of one of the plurality of transmission cycles is at least 4n(n−1)T, the length of the second transmission rest period with respect to data transmitted from the transmitting device 1 is at least T, and the length of the second transmission rest period with respect to data transmitted from the transmitting device i is at least (2n+2i−5)T, where i is an integer of at least 2.

2. A method for transmitting data according to claim 1, wherein n=2, a period of time after a commencement of transmission of the data by the transmitting device (1) up to a commencement of a first transmission period during one transmission cycle is P+T, and a period of time after a commencement of transmission of the data by the transmitting device 2 up to a commencement of a first transmission period during one transmission cycle is P, where P is an arbitrary constant.

3. A method for transmitting data according to claim 2, wherein the determination data is data for specifying an order in which the send data transmitted during the transmission periods belonging to an identical transmission cycle is transmitted.

4. A method for transmitting data according to claim 1, wherein the determination data is data for specifying an order in which the send data transmitted during the transmission periods belonging to an identical transmission cycle is transmitted.

* * * * *